United States Patent
Oldak et al.

(10) Patent No.: US 7,085,236 B2
(45) Date of Patent: Aug. 1, 2006

(54) ACTIVE QUEUE MANAGEMENT FOR DIFFERENTIATED SERVICES

(75) Inventors: Salomon Oldak, Los Angeles, CA (US); Wei-Bo Gong, Amherst, MA (US); Christopher V. Hollot, Easthampton, MA (US); Don Towsley, Amherst, MA (US); Vishal Misra, New York, NY (US); Yossi Chait, Longmeadow, MA (US)

(73) Assignee: University of Massachusetts, Amherst, Amherst, MA (US)

( * ) Notice: Subject to any disclaimer, the term of this patent is extended or adjusted under 35 U.S.C. 154(b) by 743 days.

(21) Appl. No.: 10/151,638

(22) Filed: May 20, 2002

(65) Prior Publication Data

US 2003/0214954 A1 Nov. 20, 2003

(51) Int. Cl.
   *H04L 12/28* (2006.01)
   *G01R 31/08* (2006.01)
   *G06F 15/16* (2006.01)

(52) U.S. Cl. .......... 370/235.1; 370/400; 370/412; 370/358; 709/232; 709/233

(58) Field of Classification Search ........ 370/394, 370/400, 235.1, 412, 230–234, 410, 352, 370/235, 236, 395.42, 395.2, 395.4, 395.43, 370/245, 244; 709/225, 229, 240, 223–228, 709/232, 233
See application file for complete search history.

(56) References Cited

U.S. PATENT DOCUMENTS

| | | | |
|---|---|---|---|
| 4,769,810 A | 9/1988 | Eckberg, Jr. et al. | |
| 4,769,811 A | 9/1988 | Eckberg, Jr. et al. | |
| 6,147,970 A | 11/2000 | Troxel | |
| 6,424,624 B1 * | 7/2002 | Galand et al. | 370/231 |
| 6,483,805 B1 * | 11/2002 | Davies et al. | 370/235 |
| 6,631,122 B1 * | 10/2003 | Arunachalam et al. | 370/332 |
| 6,633,575 B1 * | 10/2003 | Koodli | 370/412 |
| 6,636,482 B1 * | 10/2003 | Cloonan et al. | 370/230 |
| 6,657,954 B1 * | 12/2003 | Bird et al. | 370/229 |
| 6,748,435 B1 * | 6/2004 | Wang et al. | 709/225 |
| 6,839,321 B1 * | 1/2005 | Chiruvolu | 370/230.1 |
| 6,862,618 B1 * | 3/2005 | Gray et al. | 709/224 |

OTHER PUBLICATIONS

Sally Floyd and Van Jacobson, "Random Early Detection Gateways for Congestion Avoidance". Aug. 1993, IEEE/ACM Transactions on Networking.

James Aweya, Michel Ouellette, Delfin Y. Montuno and Alan Chapman, "A load adaptive mechanism for buffer management", 2001 Elsevier Science B.V.

James Aweya, Michel Ouellette and Delfin Y. Montuno, "A control theoretic approach to active queue management", 2001 Elsevier Science B.V.

(Continued)

*Primary Examiner*—Hanh Nguyen
(74) *Attorney, Agent, or Firm*—Fish & Richardson P.C.

(57) ABSTRACT

A method of regulating queuing delay in a network routing device independent of TCP loading is provided including receiving data packets, monitoring the data packets using token buckets and a Proportional and Integral (P+I) Active Queue Management (AQM) scheme, marking selected data packets falling within a profile, and adjusting flow preference of the monitored packets.

36 Claims, 7 Drawing Sheets

OTHER PUBLICATIONS

James Aweya, Michel Ouellette and D. Y. Montuno, "An optimization-oriented view of random early detection", 2001 Elsevier Science B.V.

Chris Hollot, Vishal Misra, Don Towsley and Wei-Bo Gong, "On designing improved controllers for AQM routers supporting TCP flows", CMPSCI Technical Report TR 00-42, Jul. 2000, University of Massachusetts, Amherst.

James Aweya, Michel Ouellette, Deflin Y. Montuno and Alan Chapman, "Enhancing TCP performance with a load-adaptive RED mechanism", 2001, International Journal of Network Management.

Yossi Chait, Salomon Oldak, C.V. Hollot and Vishal Misra, "An Adaptive Control Strategy for AQM Routers Supporting TCP Flows", Mechanical and Industrial Engineering Department, Jan. 12, 2001, University of Massachusetts, Amherst.

Sally Floyd, Ramakrishna Gummadi and Scott Shenker, "Adaptice RED: An Algorithm for Increasing the Robustness of RED's Active Queue Management", Aug. 1, 2001, AT&T Center for Internet Research at ICSI.

Ilias Andrikopoulos, Lloyd Wood and George Pavlou, "A Fair Traffic Conditioner for the Assured Service in a Differentiated Services Internet", Centre for Communication Systems Research, University of Surrey, UK.

Victor Firoiu, and Marty Borden, "A Study of Active Queue Management for Congestion Control".

Bernhard Suter, T.V. Lakshman, Dimitrios Stiliadis and Adhijit Choudhury, "Efficient Active Queue Management for Internet Routers", Bell Labs, Holmdel, NJ.

* cited by examiner

ACTIVE QUEUE MANAGEMENT FOR DIFFERENTIATED SERVICES

REFERENCE TO GOVERNMENT FUNDING

This invention was partially made with Government support under Grant No. ANI-9873328, awarded by the National Science Foundation and Grant No. F30602-00-2-0554, awarded by the Air Force. The Government has certain rights in this invention.

TECHNICAL FIELD

This invention relates to active queue management for differentiated services.

BACKGROUND

In the past decade the world has seen an explosion in Internet activity and with it has come increased expectations for performance and services. Internet users now demand faster response and new services such as quality of service (QoS), voice over IP (VoIP) and the bandwidth-intensive video streaming. The Internet serves TCP (Transmission Control Protocol) flows and UDP (User Datagram Protocol) flows.

TCP is a set of rules (protocol) used along with the Internet Protocol (IP) to send data in the form of message units between computers over the Internet. While IP takes care of handling the actual delivery of the data, TCP takes care of keeping track of the individual units of data (called packets) that a message is divided into for efficient routing through the Internet.

UDP is a communications protocol that offers a limited amount of service when messages are exchanged between computers in a network that uses the Internet Protocol. UDP is an alternative to TCP and, together with IP, is sometimes referred to as UDP/IP. Like TCP, UDP uses the Internet Protocol to actually get a data unit (sometimes called a datagram) from one computer to another. Unlike TCP, however, UDP does not provide the service of dividing a message into packets (datagrams) and reassembling it at the other end. Specifically, UDP doesn't provide sequencing of the packets that the data arrives in. This means that an application program that uses UDP must be able to make sure that the entire message has arrived and is in the right order. UDP flows do not react to any signaling from the network.

TCP implements an algorithm for flow control called Sliding Window. The "window" is the maximum amount of data we can send without having to wait for acknowledgements (ACKs). In summary, the operation of the algorithm is as follows:

1. Transmit all the new segments in the window.
2. Wait for acknowledgement/s to come (several packets can be acknowledged in the same ACK).
3. Slide the window to the indicated position and set the window size to the value advertised in the acknowledgement.

When we wait for an acknowledgement to a packet for some time and it has not arrived yet, the packet is retransmitted. When the acknowledgement arrives, it causes the window to be repositioned and the transmission continues from the packet following the one transmitted last.

The Sliding Window Flow Control assures we are not going to overload the other peer, but does not take care of network congestion. That is, the bottleneck can be (and will probably be) the network, not the receiver. The network can absorb short traffic bursts over its capacity by buffering them on the nodes. If equilibrium is reached, then self-clocking works and solves the problem. However, if we persistently try to deliver to the network more packets than it can absorb, we will fall on network congestion. It is possible that packets take so long to arrive at the other side that our timeouts will expire and we will retransmit packets unnecessarily, wasting bandwidth and increasing the congestion even more. The nodes can reach their memory limit and begin dropping packets, which we will have to retransmit (wasting bandwidth and adding extra traffic to the network that becomes even more congested). Drops are worse than they seem: when we drop a packet, the receiver cannot acknowledge further ones until the lost one arrives; therefore, we run out of send window and we have to wait for a timeout to occur, retransmit the lost packet, and wait for the cumulative acknowledgement of all the packets to continue the transmission.

There is a clear need for relatively simple and coarse methods of providing differentiated classes of service for Internet traffic, to support various types of applications, and specific business requirements. The Differentiated Services ("DiffServ") approach to providing quality of service in networks employs a small, well-defined set of building blocks from which a variety of aggregate behaviors may be built. A small bit-pattern in each packet, in the IPv4 TOS octet or the IPv6 Traffic Class octet, is used to mark a packet to receive a particular forwarding treatment, or per-hop behavior (PHB), at each network node. A common understanding about the use and interpretation of this bit-pattern is required for inter-domain use, multi-vendor interoperability, and consistent reasoning about expected aggregate behaviors in a network. An Internet Engineering Task Force (IETF) working group has standardized a common layout for a six-bit field of both octets, called the 'DS field'. IETF RFC 2474 and IETF RFC 2475 define the architecture, and the general use of bits within the DS field.

Diffserv provides different services in a scalable manner to users of the Internet. Diffserv adheres to a basic Internet philosophy, i.e., complexities should be relegated to a network edge while preserving simplicity of a core network. Two-hop behaviors are standards in the IETF, i.e., expedited forwarding (EF) and assured forwarding (AF). EF is intended to support low delay applications while AF is intended to provide throughput differentiation among clients according to a negotiated profile.

SUMMARY

In an aspect, the invention features a method including marking a set of packets in a flow of packets at an edge router of a Differentiated Services (DiffServ) network coupled with differential treatment of the flow of packets in a core router.

Embodiments may include one or more of the following. The edge router may utilize a token bucket scheme. The flow may be assigned a service profile with a value determined from a Minimum throughput Guarantee send Rate (MGR) and an actual throughput. Marking the set may include marking a packet in the flow in a token bucket associated with the flow while an actual packet rate does not exceed a service profile packet rate. Marking may also include computing the MGR dynamically based on network conditions using a single Active Rate Management (ARM) scheme for the token bucket parameters. The method may also include receiving the flow of packets in a core router, and differentiating between marked packets and unmarked packets in the received flow. Differentiating may include analyzing marked packets with a first Proportional and Integral Active Queue Management (P+I AQM) scheme, and analyzing unmarked packets with a second P+I AQM scheme. The method may also include dropping unmarked packets under congestion conditions. The flow of packets may include Transmission Control Protocol (TCP) packets and/or User Datagram Protocol (UDP) packets. In another aspect, the invention features a method including monitoring data packets passing through an edge router in a network using token buckets and a Proportional and Integral (P+I) control class of an Active Queue Management (AQM) scheme, marking selected data packets falling within a profile, and giving flow preference to marked data packets under congestion conditions.

Embodiments may include one or more of the following. The P+I AQM control class of the AQM scheme may include Assured Forwarding (AF). Marking may include setting a token bucket marker. Giving flow preference may include dropping unmarked data packets. Giving flow preference may include setting a congestion notification bit in the unmarked data packets. The data packets may include TCP packets and/or UDP packets.

In another aspect, the invention features a method of regulating queuing delay in a network routing device including receiving data packets, monitoring the data packets using token buckets in a Proportional and Integral (P+I) control class of an Active Queue Management (AQM) scheme, marking selected data packets falling within a profile, and adjusting flow preference of the monitored packets.

Embodiments may include one or more of the following. The profile may be a value calculated from an Active Rate Management (ARM) profile supplemented with information pertaining to actual throughput. Marking may include setting a token bucket marker. Adjusting may include dropping unmarked data packets under congestion conditions. Adjusting may include setting a congestion notification bit in unmarked data packets under congestion conditions. Te data packets may be TCP packets and/or UDP packets.

In another aspect, the invention features a method of regulating queuing delay including receiving data packets in a plurality of routing devices linked in a network, monitoring the data packets using token buckets and a Proportional and Integral (P+I) control class of an Active Queue Management (AQM) scheme, marking selected data packets falling within a profile, and adjusting flow preference of the monitored packets.

Embodiments may include one or more of the following. The profile may be an Active Rate Management (ARM) profile supplemented with information gained from actual throughput. Marking may include setting a token bucket marker. Adjusting may include dropping unmarked data packets under congestion conditions. Adjusting may include setting a congestion notification bit in unmarked data packets under congestion conditions. The data packets may be TCP packets and/or UDP packets.

Embodiments of the invention may have one or more of the following advantages.

The scalable adaptive active queue management (AQM) method regulates queuing delay in a router independent of TCP load. The queuing delay is tunable with a single parameter. Utilizing an externally excited adaptive loop the method leads to improved queue level management compared to that achieved using a Random Early Detection (RED) scheme.

Users have a Service Level Agreement (SLA) with a provider for specific bandwidth usage that can depend on, for example, time of day. The active rate management process takes the SLA and, together with dynamic measurements of actual behavior of a flow, and other flows in an edge router, computes token bucket parameters necessary to achieve the SLA, assuming the network has sufficient resources.

UDP flows do not react to signaling from a network and can create a problem if too many UDP flows are around since TCP flows will end up cutting there send rates and UDP flows will not. The present method functions in this environment of TCP flows and UDP flows, wherein TCP flows react to congestion signaling thereby giving implicit preference to UDP flows. In a DiffServ network, UDP flows can be marked by the token bucket. If the core routers use packet dropping and not ECN, UDP flows at the edge may be discarded, allowing only TCP flows to enter.

Other features, objects, and advantages of the invention will be apparent from the description and drawings, and from the claims.

DETAILED DESCRIPTION

Figure 1:
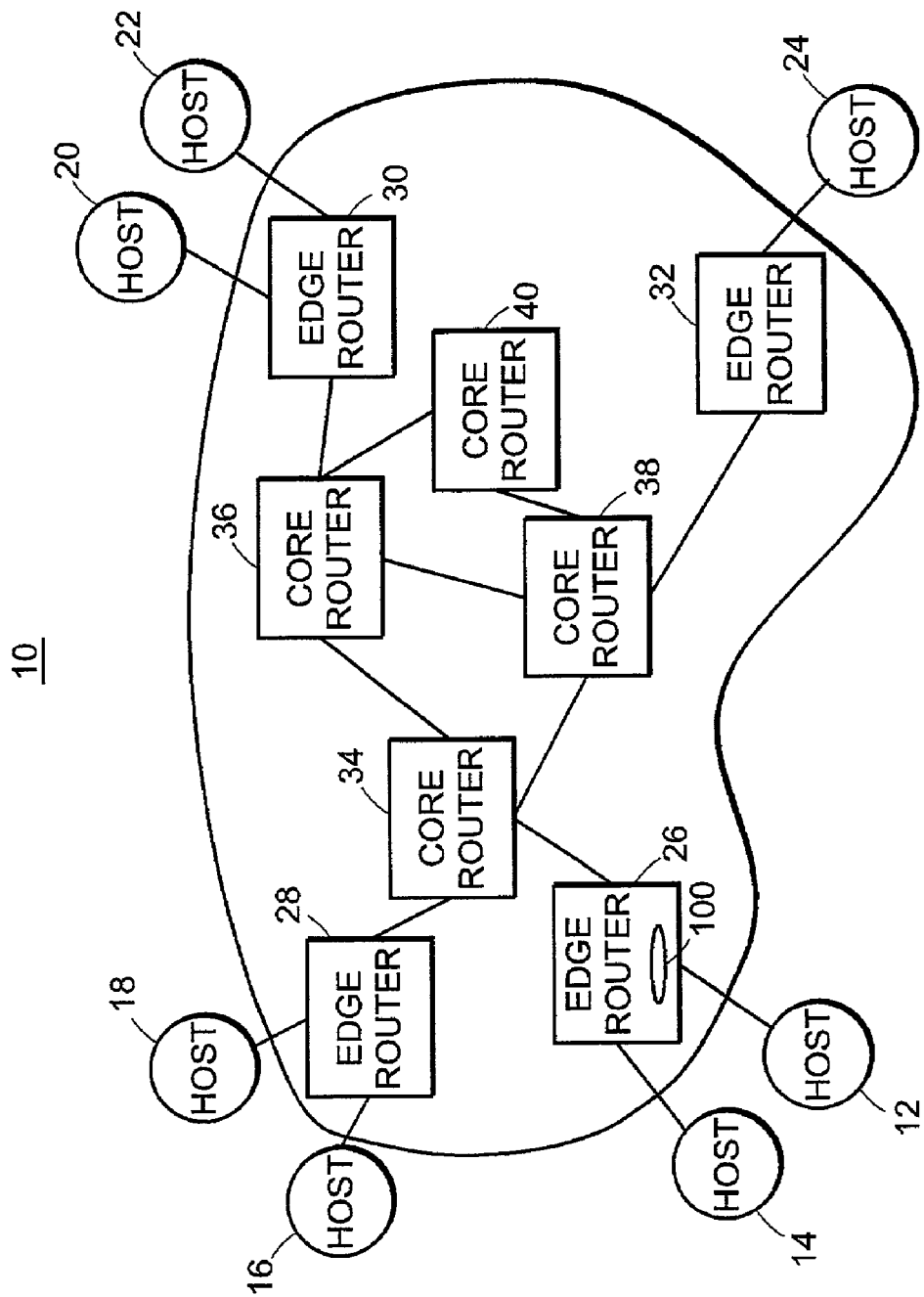
FIG. 1 is a block diagram of a differentiated service architecture network.

Referring to FIG. 1, a network 10 employs a Differentiated Services (DiffServ) architecture. The network 10 includes a number of host computer systems ("host") 12, 14, 16, 18, 20, 22, 24 and 26. Each of the hosts 12, 14, 16, 18, 20, 22 and 24 is linked to an edge router. More specifically, hosts 12 and 14 are linked to edge router 26, hosts 16 and 18 are linked to edge router 28, hosts 20 and 22 are linked to edge router 30, and host 24 is linked to edge router 32. Each of the edge routers 26, 28, 30 and 32 are linked to core routers. Specifically, edge routers 26 and 28 are linked to a core router 34, edge router 30 is linked to a core router 36 and edge router 32 is linked to edge router 38. Each of the core routers 34, 36, 38 and 40 are linked through and to each other.

An edge router is a routing device that typically routes data packets between one or more local area networks (LANs) and a backbone network. A core router is a routing device located within the backbone network that forwards data packets to systems within the backbone network (but not between networks). Core routers 34, 36, 38 and 40 make up a backbone network of the network 10. Hosts 12, 14, 16, 18, 20, 22, and 24 are located outside of the core network and connected to the core network via the edge routers 26, 28, 30 and 32, respectively.

In present day networks, e.g., the Internet, routers, both core and edge, handle in-coming packet flows and employ algorithms to avoid or minimize congestion. The high traffic levels in the Internet can force routers to hold packets for relatively long periods of time until bandwidth is available to transmit them. Routers can also run out of memory for holding packets, in which case they must discard them. This packet loss, while a normal part of the Internet protocols, is especially bad for response time, since client and server systems must wait for timers to expire before retransmission of packets.

A flow generally refers to a sequence of packets between the same source—destination pair, following the same route. Each router in the network 10 implements some queuing discipline regardless of what resource allocation mechanism is used. Queuing allocates both bandwidth and buffer space, where bandwidth determines which packets get transmitted and buffer space determines which packets get dropped. A queue scheduler employs strategies to determine which packet to serve (transmit) next and which packet to drop next (when required).

Congestion is typically handled using queue management. One queuing method is referred to as first-in-first-out (FIFO) queuing. In FIFO queuing, arriving packets get dropped when a queue is full, regardless of flow or importance. An improvement in FIFO queuing is referred to as "Drop-Tail." In drop-tail, when a router's queue (also referred to as a buffer) is filled, i.e., when incoming packets come faster than the router's capacity to output packets, all additional packets are discarded because there is no place to store the additional packets. In the drop-tail scheme, TCP senders are generally on the lookout for acknowledgements (ACKs) from a receiver that indicate such drops, and cut their send rate in such a case. Thus, drop-tail signals congestion only when the queue is already saturated, is likely to drop more packets from the same flow, and is unfair with bursty flows.

Today's routers employ Active Queue Management (AQM) schemes to attempt to effectively manage congestion conditions. One class of AQM is referred to as Random Early Detection (RED), and variations of RED. In general, a RED scheme assigns a packet drop probability based on a present average router's buffer level. Under the RED scheme, in-coming packets are dropped (or marked when ECN is enabled) based on this probability (varies between 0 and 1, wherein 1 indicates a 100% chance of being dropped).

To overcome inherent problems with the RED class of AQM, we have developed a new class of AQM that refer to as P+I AQM, disclosed in a paper submitted in 2001 to the ASME International Mechanical Engineering Congress and Exposition, and incorporated fully herein. The P+I AQM referrers to a class of dynamic controllers that include an integrator ("I") and any number of poles and zeros, i.e., any order of differential equation ("P").

As described above, the network 10 utilizes DiffServ ("DS"). DiffServ is a protocol for specifying and controlling network traffic by class so that certain types of traffic get precedence—for example, voice traffic, which requires a relatively uninterrupted flow of data, might get precedence over other kinds of traffic. DiffServ is a method for managing traffic in terms of what is called Class of Service ("CoS"). Unlike mechanisms of IEEE 802.1p tagging and Type of Service ("ToS"), DiffServ avoids simple priority tagging and depends on more complex policy or rule statements to determine how to forward a given network packet. An analogy is made to travel services, in which a person can choose among different modes of travel—train, bus, and airplane—degree of comfort, the number of stops on the route, standby status, the time of day or period of year for the trip, and so forth. For a given set of packet travel rules, a packet is given one of 64 possible forwarding behaviors—known as per hop behaviors ("PHBs"). A six-bit field, known as the Differentiated Services Code Point ("DSCP"), in the Internet Protocol ("IP") header, specifies the per hop behavior for a given flow of packets. Differentiated Services and the Class of Service approach provide a way to control traffic that is both more flexible and more scalability than the Quality of Service approach.

The DiffServ network 10 also utilizes Assured Forwarding ("AF") as defined in IETF RPC 259. AF provides delivery of IP packets in four independently forwarded AF classes. Within each AF class, an IP packet can be assigned one of three different levels of drop precedence. A DiffSserv network node (e.g., edge routers and core routers) does not reorder IP packets of the same microflow if they belong to the same AF class.

There is a demand to provide assured forwarding of IP packets over the network 10, for example, the Internet. In a typical application, a company uses the Internet to interconnect its geographically distributed sites and wants an assurance that IP packets within this intranet are forwarded with high probability as long as the aggregate traffic from each site does not exceed the subscribed information rate (profile). It is desirable that a site may exceed the subscribed profile with the understanding that the excess traffic is not delivered with as high probability as the traffic that is within the profile. It is also important that the network does not reorder packets that belong to the same microflow, no matter if they are in or out of the profile. AF is a technique for a provider DiffServ network domain to offer different levels of forwarding assurances for IP packets received from a customer DiffServ network domain. Four AF classes are defined, where each AF class is in each DiffServ network node allocated a certain amount of forwarding resources (buffer space and bandwidth). IP packets that wish to use the services provided by the AF PHB are assigned by the customer or the provider DiffServ network domain into one or more of these AF classes according to the services that the customer has subscribed to.

Within each AF class IP packets are marked (again by the customer or the provider DiffServ network domain) with one of three possible drop precedence values. In case of congestion, the drop precedence of a packet determines the relative importance of the packet within the AF class. A congested DiffServ network node tries to protect packets with a lower drop precedence value from being lost by preferably discarding packets with a higher drop precedence value.

In a DiffServ network node, the level of forwarding assurance of an IP packet thus depends on (1) how much forwarding resources has been allocated to the AF class that the packet belongs to, (2) what is the current load of the AF class, and, in case of congestion within the class, and (3) what is the drop precedence of the packet.

For example, if traffic conditioning actions at the ingress of the provider DiffServ network domain make sure that an AF class in the DiffServ network nodes is only moderately loaded by packets with the lowest drop precedence value and is not overloaded by packets with the two lowest drop precedence values, then the AF class can offer a high level of forwarding assurance for packets that are within the subscribed profile (i.e., marked with the lowest drop precedence value) and offer up to two lower levels of forwarding assurance for the excess traffic.

Data packets flowing from a sender, e.g., host 12, to a receiver, e.g., host 14, pass through a router, e.g., edge router 26. In this example, edge router 26 buffers, i.e., queues up, the data packets before sending them out to the host 14. If the number of data packets received by the edge router 26 exceeds its queue size, congestion occurs. When congestion occurs, some data packets may be dropped prior to being sent to host 14 to relieve the congestion.

Routers, using AQM as described above, can assist in network management by sensing congestion and preemptively signaling TCP rather than having TCP react to unreceived data packets.

We have determined that AQM schemes are essentially feedback control systems. In general, the purpose of adding a feedback controller is to reduce the sensitivity of the system to disturbances and model inaccuracies. Controllers can make unstable systems stable and drastically improve system performance.

As is described below, we use a token bucket concept such that a bucket sits at (virtually or physically) an edge router of a DiffServ network, such as network 10. Each flow (or an aggregate of flows) is assigned a service profile with a Minimum throughput Guarantee send Rate ("MGR"). The bucket, which is assigned to each such flow (or aggregate of flows), marks (or colors) all packets as long as their rate is not higher than in their profile. When the rate is higher, the packets will not be marked.

Proposals have suggested that the bucket will use the MGR as the reference value for each flow. We have found that this will not work and it cannot guarantee MGRs even if the network 10 has the capacity to do so. We describe below how buckets should not use these MGRs as their reference value. Rather, we compute MGRs dynamically, based on network conditions. This is accomplished using an Active Rate Management (ARM) concept, i.e., one ARM for each bucket. The ARM method itself is a dynamic controller similar to the one used in a P+I AQM.

The network 10 focuses on services built on top of AF PHB. Using token buckets, routers at the edge, e.g., edge routers 26, 28, 30, 32, of the network 10 monitor and mark data packets (e.g., a first color) when they fall within a profile in an Active Rate Management (ARM) marking process 100. Otherwise the data packets remain unmarked. The core routers 34, 36, 38, 40, give preference to marked data packets. In the presence of congestion, unmarked data packets are more likely to be dropped (or have their congestion notification bit set in the presence of Explicit Congestion Notification ("ECN")). The ARM marking process 100, described below, is installed in each of the edge routers 26, 28, 30, 32, and provides a network provider the ability to deliver throughput differentiation to different users by appropriate setting of edge markers. In order to provide minimum throughputs to aggregates, the ARM marking process 100 is responsible for setting a token bucket marker.

For example, users have a Service Level Agreement (SLA) with a provider for specific bandwidth usage that can depend on, for example, time of day. An SLA is a contract between a network service provider and a customer that specifies, usually in measurable terms, what services the network service provider will furnish. Many Internet service providers (ISPs) provide their customers with an SLA. The active rate management marking process 100 takes the SLA and, together with dynamic measurements of actual behavior of a flow, and other flows in an edge router, computes token bucket parameters necessary to achieve the SLA, assuming the network 10 has sufficient resources.

The ARM marking process 100 handles both TCP flows and UDP flows. UDP flows do not react to signaling from a network and can create a problem if too many UDP flows are around since TCP flows will end up cutting their send rates and UDP flows will not. The ARM marking process 100 functions in this environment of TCP flows and UDP flows, wherein TCP flows react to congestion signaling thereby giving implicit preference to UDP flows. In a DiffServ network, UDP flows can be marked by the token bucket. If the core routers use packet dropping and not ECN, UDP flows at the edge may be discarded, allowing only TCP flows to enter.

The ARM marking process 100 assumes a fluid-flow model for TCP flows and AQM routers. More specifically, assume m edge routers, each serving a number of aggregates of $N_i$ identical TCP flows with each having token buckets with a rate $A_i(t)$ and size $B_i \gg 1$, $i=1, \ldots, m$. These edges feed a core router with a link capacity C and queue length q. At time t>0, each TCP flow is characterized by its average window size $W_i(t)$ and average round-trip time $$R_i(t) \triangleq T_i + \frac{q(t)}{C}$$

where $T_i$ is the propagation delay. The sending rate $r_i$ of an edge is $$r_i(t) = \frac{N_i W_i(t)}{R_i(t)}.$$

The fluid flow model for this network is described by m+1 coupled differential equations; one equation for each of the m TCP window dynamics and one for the (possibly congested) AQM router. The differential equation for the AQM router is given by $$\frac{dq(t)}{dt} = \begin{cases} -C + \sum_{i=1}^{m} r_i(t), & q(t) > 0 \\ \left[-C + \sum_{i=1}^{m} r_i(t)\right]^+, & q(t) = 0 \end{cases}$$

while each TCP flow satisfies $$\frac{dW_i(t)}{dt} = \frac{1}{R_i(t)} - \frac{W_i(t) W_i(t - R_i(t))}{2 R_i(t - R_i(t))} p_i(t - R_i(t))$$

where $p_i(t)$ denotes a probability that a mark is generated for the fluid.

The AQM marking process 100 lets $f_i^g(t)$ be the fraction of fluid marked with the first color i.e., $$f_i^g(t) = \min\left\{1, \frac{A_i(t)}{r_i(t)}\right\}$$

and $1 - f_i^g(t)$ to be the fraction. At the core, let $p_g(t)$ and $p_r(t)$ denote the probabilities that marks are generated for the colored and uncolored, respectively. Consistent with DiffServ, we assume that $0 \leq p_g(t) < p_r(t) \leq 1$. Probability $p_i(t)$ is then related to the colored and uncolored marks by $$p_i(t) = f_i^g(t) p_g(t) + (1 - f_i^g(t)) p_r(t).$$

Let $\tilde{r}_i$ denote the MGR for the i-th aggregate at an edge. We say that the router is over-provisioned if $$\sum_{i=1}^{m} \tilde{r}_i < C$$

and under-provisioned if $$\sum_{i=1}^{m} \tilde{r}_i > C.$$

Last, we say that it is exactly provisioned if $$\sum_{i=1}^{m} \tilde{r}_i = C.$$

The network dynamics at equilibrium, yield:

$$\sum_{i=1}^{m} r_i = C$$

where $$r_i = \frac{\sqrt{2} N_i}{R_i \sqrt{p_i}} = \frac{\sqrt{2} N_i}{R_i \sqrt{f_i^g p_g + (1 - f_i^g) p_r}}$$

Given network parameters ($\{N_i\}$, $\{R_i\}$, C), and MGRs $\{\tilde{r}_i\}$ satisfying $$\sum \tilde{r} \leq C,$$

we say the over-provisioned Diffserv network is feasible if there exist ($\{f_i^g\}$, $p_g$, $p_r$) such that the differential equation for the AQM router is satisfied with $$0 \leq f_i^g \leq 1; \ r_i \geq \tilde{r}_i; \ 0 \leq p_g \leq p_r \leq 1$$

Above, we discussed equilibria of this system independent of the core queuing and marking edge policies. We now present the control scheme i.e., process 100, which will maintain desired performance around this equilibrium in the face of changing session loads, propagation times and other network parameters. To this end, again consider the system of nonlinear differential equations where, now, we explicitly show dependence on the bucket rate $A_i$:

$$\dot{q}(t) = -C + \sum_{i=1}^{m} \frac{N_i W_i(t)}{R_i(t)} \triangleq f(q, W_i, p_g, p_r, A_i)$$

$$\dot{W}_i(t) = \frac{1}{R_i(t)} - \frac{W_i(t) W_i(t - R_i(t))}{2 R_i(t - R_i(t))} \cdot \left( \frac{A_i}{r_i(t)} p_g(t - R_i(t)) + \left(1 - \frac{A_i}{r_i(t)} p_r(t - R_i(t))\right) \right) \triangleq g_i(q, W_i, p_g, p_r, A_i)$$

We follow the same design philosophy discussed above, namely, deriving controllers based on linearized LTI models. First, we identify the equilibrium point ($q_o$, $W_{io}$, $p_{go}$, $p_{ro}$, $A_{io}$) which satisfies $$0 = -C + \sum_{i=1}^{m} \frac{N_i W_{io}}{R_i}$$

$$0 = 1 - \left( \frac{A_{io}}{r_{io}} p_{go} + \left(1 - \frac{A_{io}}{r_{io}}\right) p_{ro} \right) \frac{W_{io}^2}{2}$$

$$R_i = T_i + \frac{q_o}{C}.$$

In the linearization we make two approximations. Firstly, we ignore delay $R_i$ in the term $W_i(t-R_i)/R_i(t-R_i)$, but deal with it in the probability terms $p_r(t-R_i)$ and $p_g(t-R_i)$. Secondly, we replace saturation terms min $$\left(1, \frac{A_i}{r_i}\right)$$

with $$\frac{A_i}{r_i}.$$

Finally, linearization about the equilibrium point gives $$\frac{\delta q(t)}{dt} = \sum_{i=1}^{m} \frac{\partial f}{\partial W_i} \delta W_i(t)$$

$$\frac{\delta W_i(t)}{dt} = \frac{\partial g_i}{\partial W_i} \delta W_i(t) + \frac{\partial g_i}{\partial p_g} \delta p_g(t - R_i) + \frac{\partial g_i}{\partial p_r} \delta p_r(t - R_i) + \frac{\partial g_i}{\partial A_i} \delta A_i(t)$$

where $\delta q \equiv q(t) - q_o$ $\delta W_{io} \equiv W_i(t) - W_{io}$ $\delta p_g \equiv p_g(t) - p_{go}$ $\delta p_r \equiv p_r(t) - p_{ro}$ $\delta A_i \equiv A_i(t) - A_{io}$ and where evaluating the partial at this equilibrium point gives (partials not shown are zero)

$$\frac{\partial f}{\partial q} = -\sum_{i=1}^{m} \frac{r_{io}}{CR_i}$$

$$\frac{\partial f}{\partial W_i} = \frac{N_i}{R_i}$$

$$\frac{\partial g_i}{\partial W_i} = -\frac{A_{io}}{2N_i}(p_{go} - p_{ro}) - \frac{W_{io}}{R_i}p_{ro}$$

$$\frac{\partial g_i}{\partial p_r} = \frac{W_{io}A_{io}}{2N_i} - \frac{W_{io}^2}{2R_i}$$

$$\frac{\partial g_i}{\partial p_g} = -\frac{A_{io}W_{io}}{2N_i}$$

$$\frac{\partial g_i}{\partial A_i} = -\frac{W_{io}}{2N_i}(p_{go} - p_{ro}).$$

Figure 2:
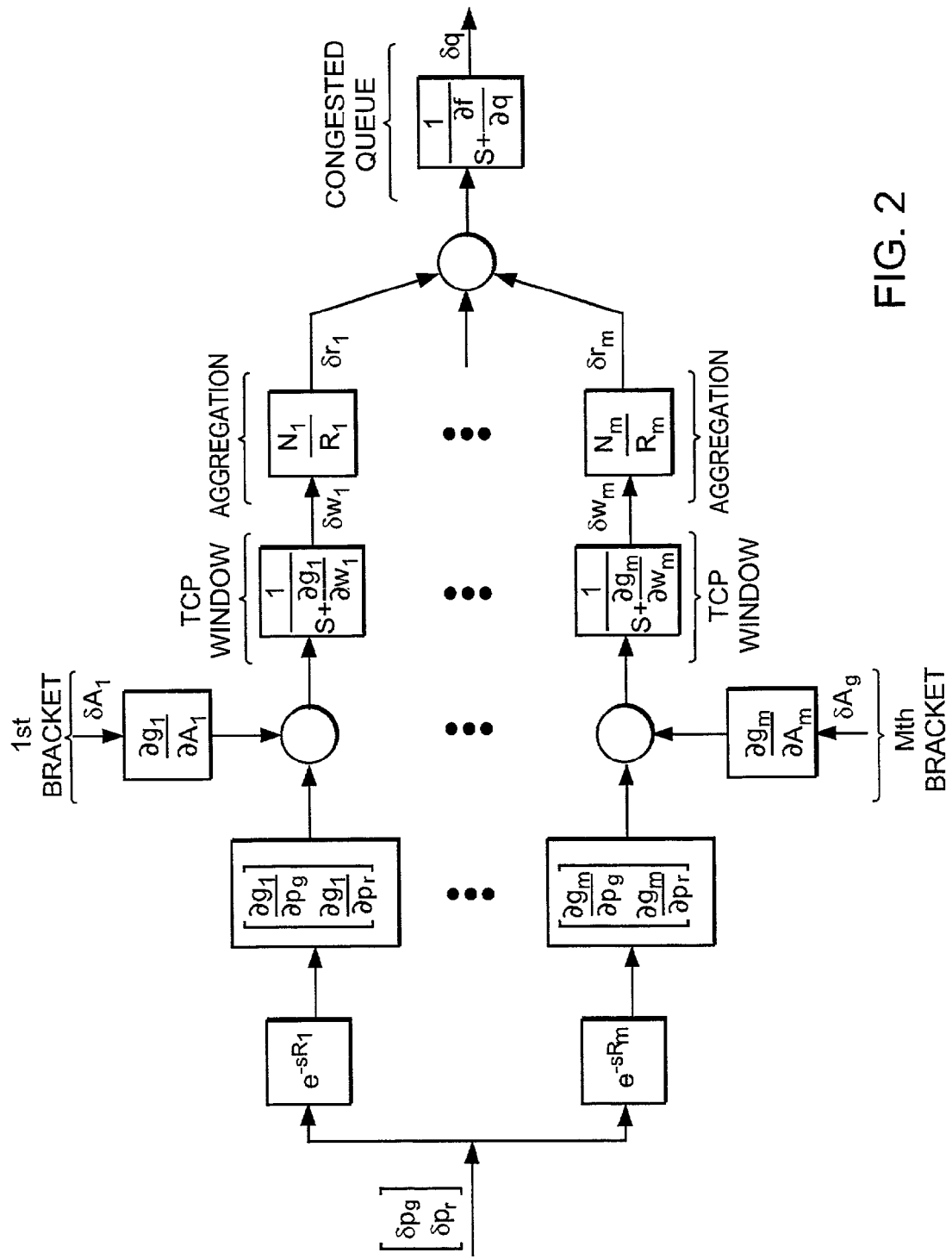
FIG. 2 is a block diagram of an open-loop DiffServ network.

Performing a Laplace transformation, we obtain a block diagram representation for the open-loop system shown in FIG. 2.

The open-loop plant, obtained from the above-equation, is defined as:

$$\delta W_i(s) = \frac{\frac{\partial g}{\partial A_i}}{s - \frac{\partial g}{\partial W_i}}\delta A_i(s) + \frac{\frac{\partial g}{\partial p_g}}{s - \frac{\partial g}{\partial W_i}}e^{-sR_i}\delta p_g(s) +$$

$$= \frac{\frac{\partial g}{\partial p_r}}{s - \frac{\partial g}{\partial W_i}}e^{-sR_i}\delta p_r(s)$$

$$\delta q(s) = \sum_{i=1}^{m} \frac{\frac{\partial f}{\partial W_s}}{s - \frac{\partial f}{\partial q}}\delta W_i(s).$$

In a compact matrix transfer-function form, we write:

$$\begin{bmatrix} \delta W_1(s) \\ \vdots \\ \delta W_m(s) \\ \delta q(s) \end{bmatrix} = P(s) \begin{bmatrix} \delta A_1(s) \\ \vdots \\ \delta A_m(s) \\ \delta p_g(s) \\ \delta p_r(s). \end{bmatrix}$$

The purpose of ARM is to regulate the token bucket rate $A_i$ such that $r_i \geq \hat{r}_i$ if capacity is available. Since our ARM compares an aggregate's send rate to its MGR, it is necessary to construct an estimate for this send rate. We follow the TSW procedure which includes the following. The send rate is computed by measuring the number of sent packets over a fixed time period $T_{TSW}$. This value is then smoothed by a low-pass filter. A fluid model for this dynamic is given by:

$$F(s) = \frac{a}{s+a}e^{-sT_{TSW}},$$

Figure 3:
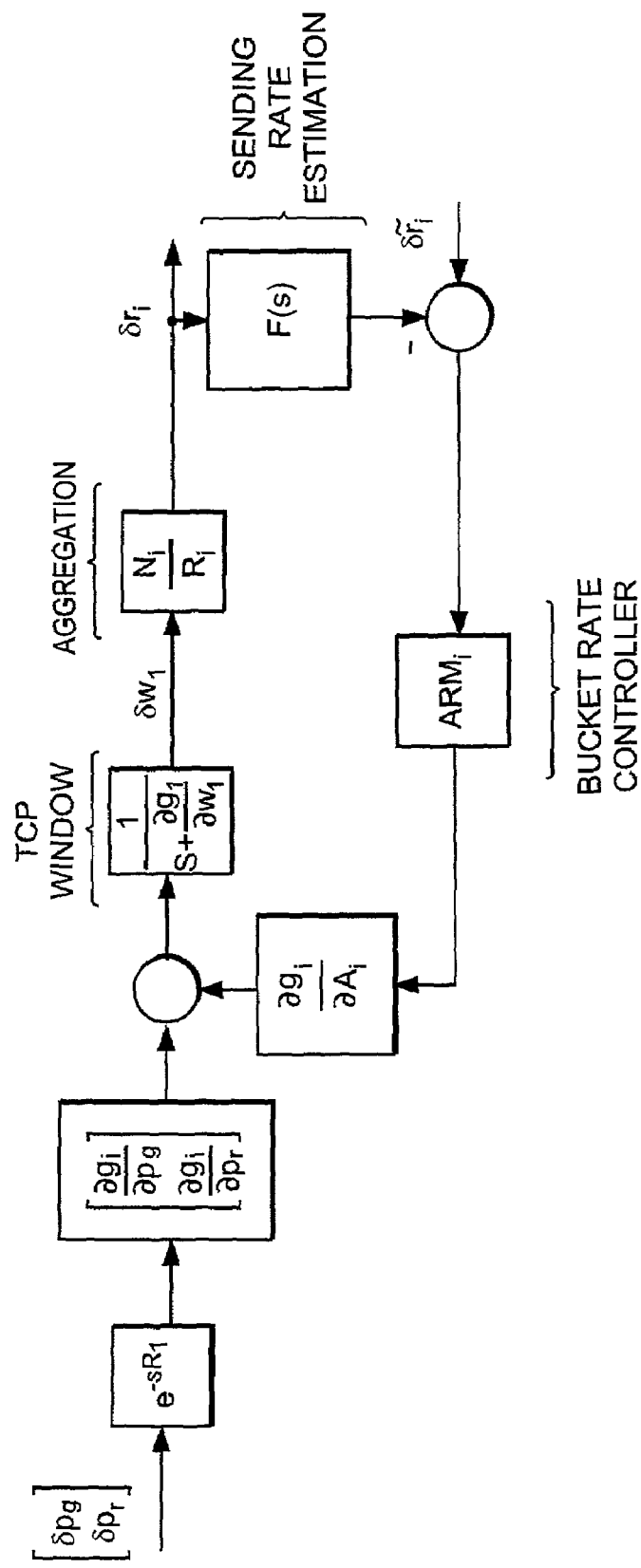
FIG. 3 is a block diagram of an ARM control system.

For this purpose, we introduce the feedback structure as shown in FIG. 3.

A limitation of a RED design (inherent in the nature of a RED controller) is that response time of the control system is quite long. One way to improve the response time of the system is to remove a low pass filter and introduce what is known as a classical proportional controller. In proportional control, the feedback signal is simply the regulated output (queue length) multiplied by a gain factor. In the RED context, it corresponds to obtaining the loss probability from the instantaneous queue length instead of the averaged queue length. Averaging can lead to instability and low frequency oscillations in the regulated output. One can design an integral controller for AQM that will attempt to clamp the queue size to some reference value $q_{ref}$, regardless of load level. The simplest of such integral controllers is a Proportional Integrator (PI) controller. The PI controller is appropriate in the AQM context as it is possible to design controllers having a much higher loop bandwidth than, for example, LPF RED controllers with equivalent stability margins. Higher bandwidth results in a faster response time.

Figure 4:
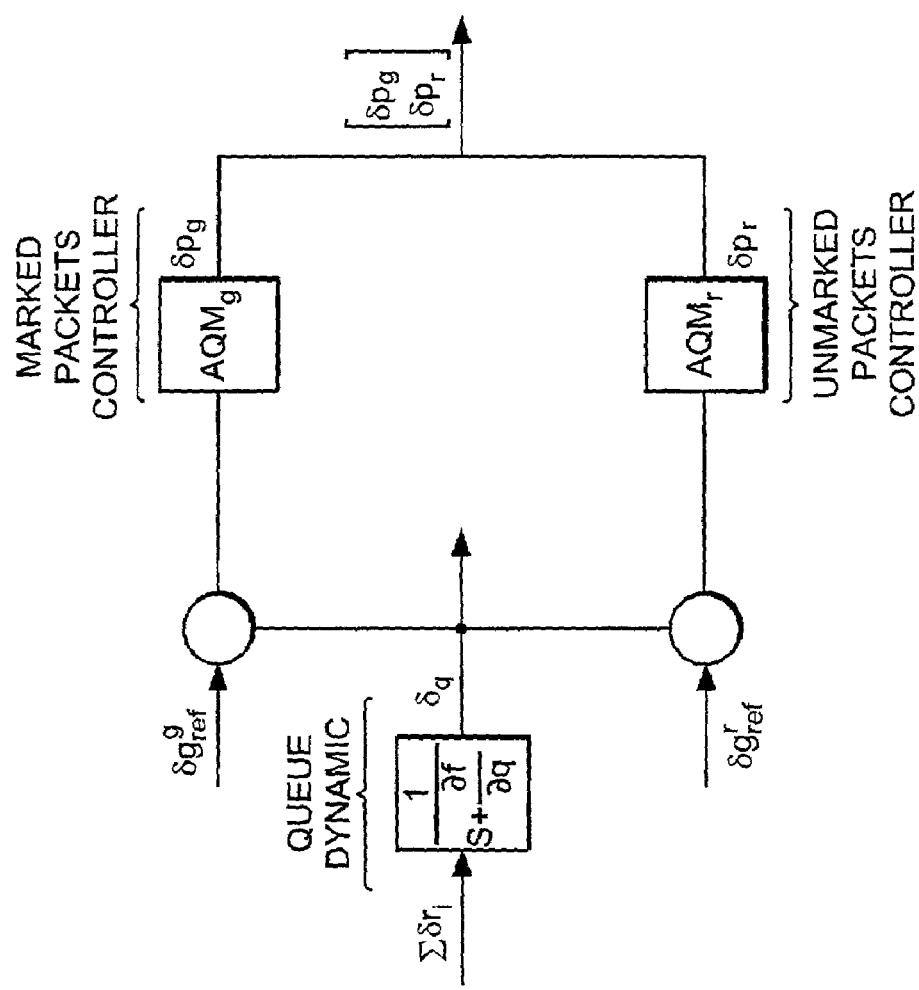
FIG. 4 is a block diagram of a multi level AQM controller.

In a DiffServ network such as network 10, we modify the standard the PI AQM by introducing two set points for the core queue, $q^g_{ref}$ and $q^r_{ref}$ as shown in FIG. 4. In an under-provisioned case, q must converge to $q^g_{ref}$, otherwise to $q^g_{ref}$ or $q^r_{ref}$. The marking probabilities, $p_g$ and $p_r$, for the colored and uncolored fluid, respectively, are computed by two AQM controllers, $AQM_g(s)$ and $AQM_r(s)$. To this end, we use the same parameter in both loops, that is, $AQM(s) = AQM_g(s) = AQM_r(s)$.

With the two-level AQM in place, it is now possible to be more explicit and to describe feasible bucket rates. To begin, assume the equilibrium queue length is either $q^r_{ref}$ or $q^g_{ref}$. If $q_o = q^r_{ref}$, then, due to the integrator in the AQM controller, $p_{go} = 0$ and $0 < P_{ro} < 1$. Thus, the set of feasible marking probabilities of colored fluid is $$P_r = \left\{ p_{ro} : \max_i \frac{2N_i^2}{\hat{r}_i^2 R_i^2} < p_{ro} < 1 \right\}$$

As long as $\rho_r$ is non-empty, the bucket-rates $A_{io}$ solving the Diffserv problem are non-unique. Indeed, the set of feasible bucket rates is $$A_i = \left\{ A_{io} : 1 < A_{io} < r_{io}\left(1 - \frac{2N_i^2}{\hat{r}_{io}^2 R_i^2 p_{ro}}\right), p_{ro} \in P_r \right\}.$$

Conversely, if $q_o = q^g_{ref}$, then, due to the integrator in the AQM, $p_{ro} = 1$ and $0 < p_{go} < 1$. The set of feasible bucket rates can be expressed in terms of $p_{go}$ as follows:

$$A_i = \{A_{io} : A_{io} = \min\{1, \gamma(p_{go})\}, p_{go} \in (0,1)\}$$

where $$\gamma(p_{go}) = \frac{r_{io}}{1 - p_{go}}\left(1 - \frac{2N_i^2}{\hat{r}_{io}^2 R_i^2}\right)$$

Using these parameterizations, we will analyze the stability of these feasible points.

Figure 5:
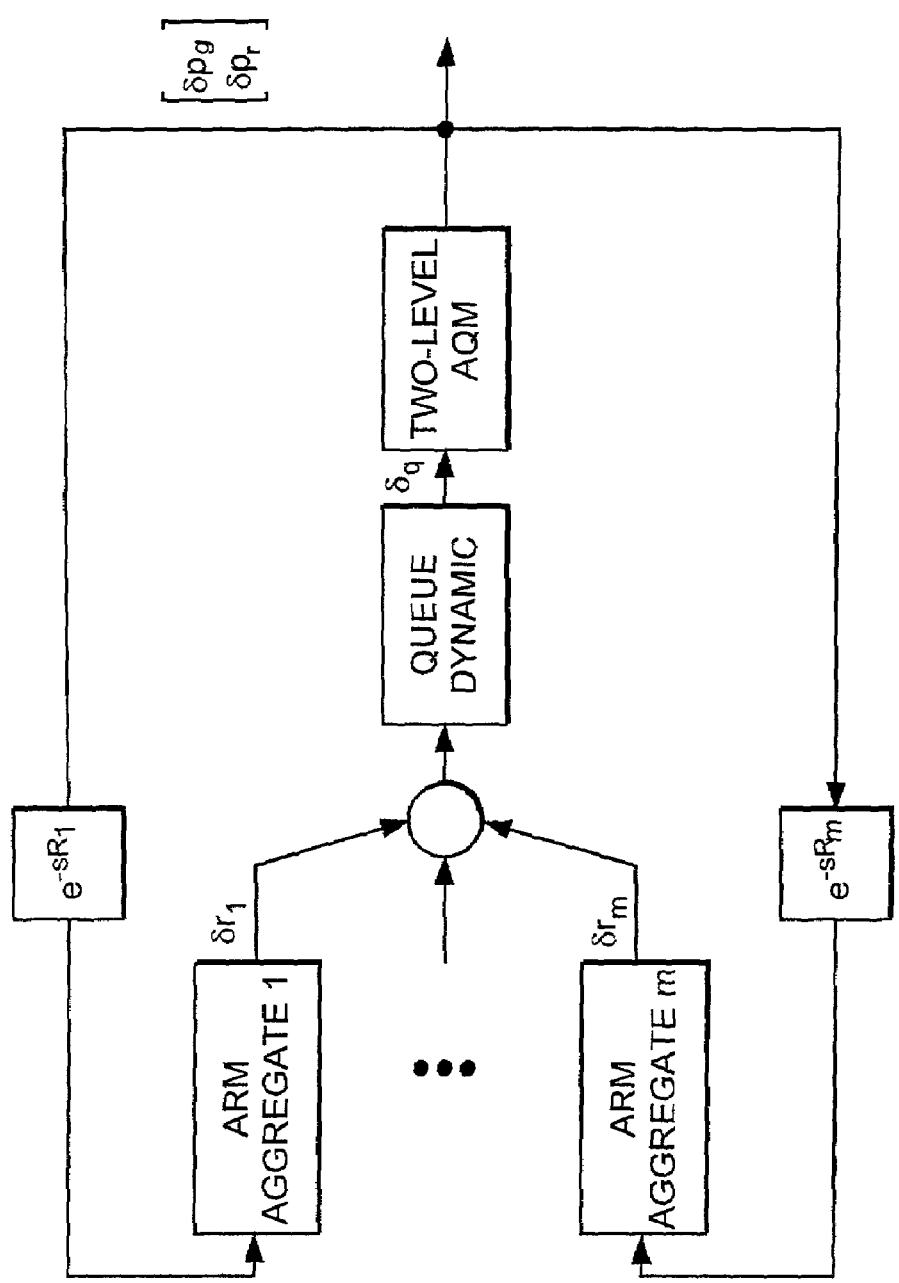
FIG. 5 is a block diagram or a combined ARM/AQM DiffServ network.
Figure 6:
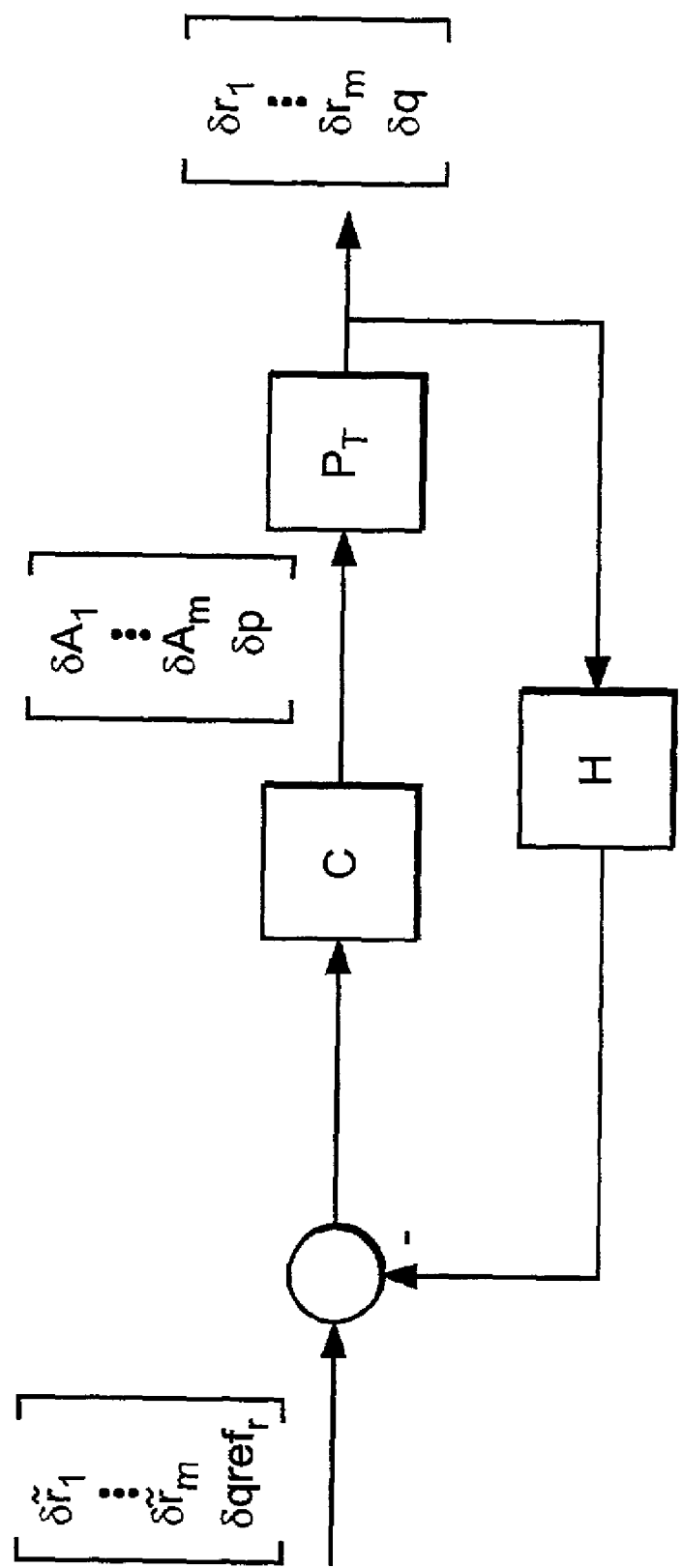
FIG. 6 is a block diagram of an ARM/AQM DiffServ control system.

A combined ARM/AQM DiffServ network is shown in FIG. 5. For control analysis and design, we put this network in a standard block diagram format as shown in FIG. 6. Around the equilibrium queue length $q_o = q^r_{ref}$, the linearized dynamics becomes $$\begin{bmatrix} \delta W_1(s) \\ \vdots \\ \delta W_m(s) \\ \delta q(s) \end{bmatrix} = P(s) \begin{bmatrix} \delta A_1(s) \\ \vdots \\ \delta A_m(s) \\ \delta p_r(s) \end{bmatrix}$$

while, for $q_0 = q^q_{ref}$, we have $$\begin{bmatrix} \delta W_1(s) \\ \vdots \\ \delta W_m(s) \\ \delta q(s) \end{bmatrix} = P(s) \begin{bmatrix} \delta A_1(s) \\ \vdots \\ \delta A_m(s) \\ \delta p_g(s) \end{bmatrix}$$

Since the variables of interest are send rates $\{r_i\}$, we form $$P_T(s) = \begin{bmatrix} \mathrm{diag}\left\{\frac{N_1}{R_1}, \ldots, \frac{N_m}{R_m}\right\} & 0_{m \times 1} \\ 0_{1 \times m} & 1 \end{bmatrix} P(s)$$

The controller is described by $$C(s) = \begin{bmatrix} \mathrm{diag}\{C_{ARM_1}(s), \ldots, C_{ARM_m}(s)\} & 0_{m \times 1} \\ 0_{1 \times m} & -C_{AQM}(s) \end{bmatrix}.$$

Specifically, the AQM controller has the same PI structure introduced in:

$$C_{AQM}(s) = \frac{k_{aqm}\left(\frac{s}{z_{aqm}} + 1\right)}{s}$$

The ARM controller has similar structure with additional low-pass filtering $$C_{ARM}(s) = \frac{k_{arm}\left(\frac{s}{z_{arm}} + 1\right)}{s} \cdot \frac{1}{\left(\frac{s}{p_{arm}} + 1\right)}.$$

Finally, the rate estimator H is given by $$H(s) = \begin{bmatrix} \mathrm{diag}\{F(s), \ldots, F(s)\}_{m \times m} & 0_{m \times 1} \\ 0_{1 \times m} & 1 \end{bmatrix}$$

Figure 7:
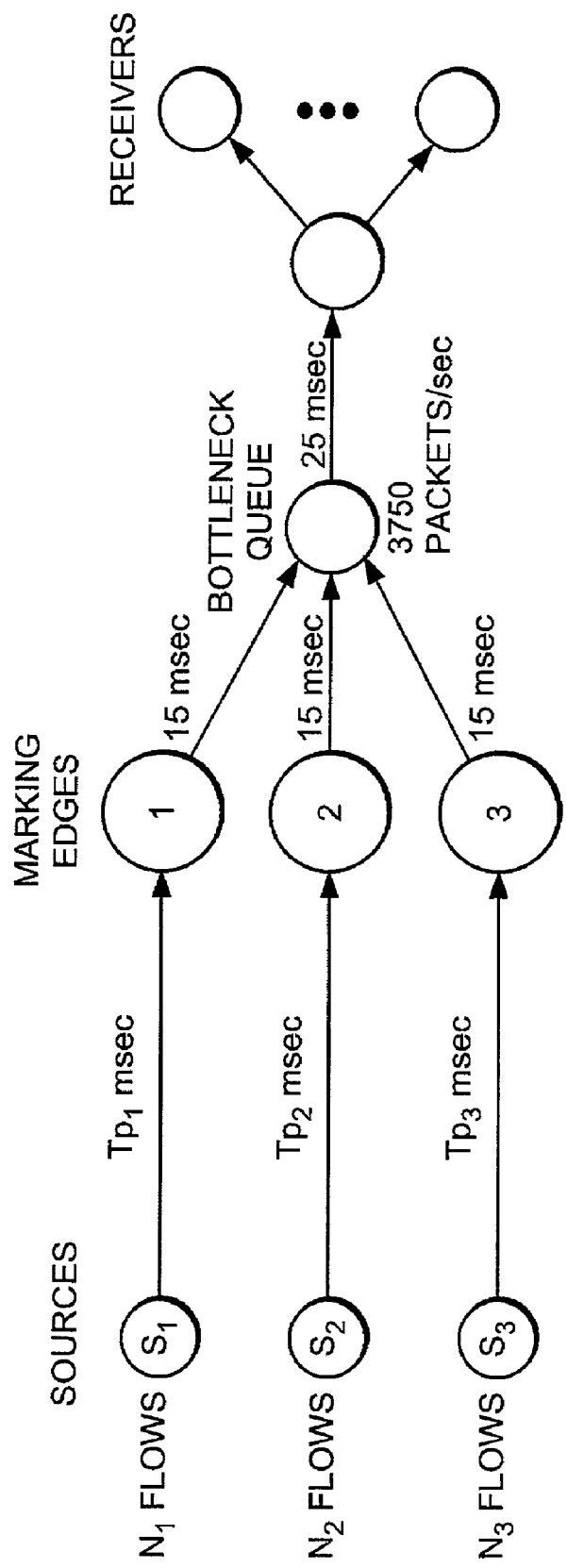
FIG. 7 is a block diagram of a simulated DiffServ network

To validate the fluid model and feasibility of our new ARM/AQM DiffServ paradigm, we constructed a network consisting of three set of senders, each served by a marking edge with a token bucket as shown in FIG. 7. These edges feed into a congested core with differentiation ability. The propagation delays $T_{pi}$ are all uniform in the ranges: $T_{p1} \in [50-90]$ sec, $T_{p2} \in [15-25]$ msec and $T_{p3} \in [0-10]$ msec. Each sender consists of $N_i$ FTP flows, all staring uniformly in [0,50] sec, with $N_1=20$, $N_2=30$, and $N_3=25$. The differentiating core queue has a buffer size of 800 packets, capacity of C=3750 pkt/sec and ECN marking enabled. We used an average packet size of 500 Bytes.

The closed-loop matrix transfer function T(s)

$$\begin{bmatrix} \delta r_1(s) \\ \delta r_2(s) \\ \delta r_3(s) \\ \delta q_{ref}(s) \end{bmatrix} = T(s) \begin{bmatrix} \delta \tilde{r}_1(s) \\ \delta \tilde{r}_2(s) \\ \delta \tilde{r}_3(s) \\ \delta q(s) \end{bmatrix}$$

is given by $$T(s) = P_T(s)C(s)(I + P_T(s)C(s)H(s))^{-1}$$

where I denotes a 3×3 identity matrix.

$$C_{AQM}(s) = \frac{9.6 \times 10^{-6}\left(\frac{s}{0.53} + 1\right)}{s}$$

where its output state, a marking probability ($p_r$ or $p_g$), was appropriately limited to [0,1] to avoid integrator windup. This controller was discretize with a sampling rate of 37.5 Hz. The set points for the uncolored and colored controllers were $q^r_{ref}=100$ and $q^g_{ref}=250$ packets. The idea behind this choice was to allow the queue, if possible, to converge to the lower queue level where $p_g=0$.

The ARM controller has a similar structure to the above, but with different parameters to reflect the different dynamics of the send window and token bucket:

$$C_{ARM}(s) = \frac{0.05\left(\frac{s}{0.1} + 1\right)}{s(s+1)}$$

This controller was discretized with a sampling rate of 38.5 Hz.

The send rate estimator used the Time Slice window (TSW) algorithm with a $T_{TSW}=1$ second time slice. This was smoothed used a first-order, low-pass filter with a corner frequency of a=1 rad/sec.

Since the queue level at equilibrium maybe either 100 or 250 packets, we analyze stability around each point. Using frequency response concepts, it can be shown that the DiffServ system is stable around each of these points over the feasible ranges of marking probabilities.

Other embodiments are within the scope of the following claims.

What is claimed is:

1. A method comprising:
   marking a set of packets in a flow of packets at an edge router of a Differentiated Services (DiffServ) network, wherein the marked packets fall within a profile that is dynamically adjustable over an unbounded range based on the difference between a minimum throughput rate associated with the profile and a send rate of the flow of packets; and
   providing, based on the marking performed on the set of packets, preferential treatment of the flow of packets in a core router so that a first kind of traffic takes precedent over a second kind of traffic.

2. The method of claim 1 in which the edge router utilizes a token bucket scheme.

3. The method of claim 1 further comprising:
receiving the flow of packets in a core router; and
differentiating between marked packets and unmarked packets in the received flow.

4. The method of claim 3 in which differentiating comprises
analyzing marked packets with a first Proportional and Integral Active Queue Management (P+I AQM) scheme; and
analyzing unmarked packets with a second P+I AQM scheme.

5. The method of claim 4 further comprising processing packets under congestion conditions.

6. The method of claim 5, wherein processing packets comprises dropping unmarked packets.

7. The method of claim 1 in which the flow of packets includes Transmission Control Protocol (TCP) packets.

8. The method of claim 1 in which the flow of packets includes User Datagram Protocol (UDP) packets.

9. The method of claim 1 in which the flow of packets includes Transmission Control Protocol (TCP) packets and UDP packets.

10. A method comprising:
monitoring data packets passing through an edge router in a network using token buckets and a Proportional and Integral (P+I) control class of an Active Queue Management (AQM) scheme to determine a send rate;
marking selected data packets falling within a profile associated with a minimum throughput rate, wherein the profile is dynamically adjustable over an unbounded range based on the difference between the minimum throughput rate and the determined send rate; and
giving flow preference to marked data packets under congestion conditions.

11. The method of claim 10 in which the P+I AQM control class of the AQM scheme includes Assured Forwarding (AF).

12. The method of claim 10 in which marking comprises selling a token bucket marker.

13. The method of claim 10 in which giving flow preference comprises dropping unmarked data packets.

14. The method of claim 10 in which giving flow preference comprises setting a congestion notification bit in the unmarked data packets.

15. The method of claim 10 in which the data packets include Transmission Control Protocol (TCP) packets.

16. The method of claim 10 in which the data packets include User Datagram Protocol (UDP) packets.

17. The method of claim 10 in which the data packets include Transmission Control Protocol (TCP) packets and User Datagram Protocol (UDP) packets.

18. A method of regulating queuing delay in a network routing device, the method comprising:
receiving data packets;
monitoring the data packets using token buckets in a Proportional and Integral (P+I) control class of an Active Queue Management (AQM) scheme to determine a send rate;
marking selected data packets falling within a profile associated with a minimum throughput rate, wherein the profile is dynamically adjustable over an unbounded range based on the difference between the minimum throughput rate and the determined send rate; and
adjusting flow preference of the monitored packets.

19. The method of claim 18 in which the profile is an Active Rate Management (ARM) profile supplemented with information pertaining to actual throughput.

20. The method of claim 18 in which marking comprises setting a token bucket marker.

21. The method of claim 18 in which adjusting comprises dropping unmarked data packets under congestion conditions.

22. The method of claim 18 in which adjusting comprises setting a congestion notification bit in unmarked data packets under congestion conditions.

23. The method of claim 18 in which the data packets are Transmission Control Protocol (TCP) packets.

24. The method of claim 18 in which the data packets are User Datagram Protocol (UDP) packets.

25. The method of claim 18 in which the data packets are Transmission Control Protocol (TCP) packets and User Datagram Protocol (UDP) packets.

26. A method of regulating queuing delay, the method comprising:
receiving data packets in a plurality of routing devices linked in a network;
monitoring the data packets using token buckets and a Proportional and Integral (P+I) control class of an Active Queue Management (AQM) scheme to determine a send rate;
marking selected data packets falling within a profile associated with a minimum throughput rate, wherein the profile is dynamically adjustable over an unbounded range based on the difference between the minimum throughput rate and the determined send rate; and
adjusting flow preference of the monitored packets.

27. The method of claim 26 in which the profile is an Active Rate Management (ARM) profile supplemented with information gained from actual throughput.

28. The method of claim 26 in which marking comprises setting a token bucket marker.

29. The method of claim 26 in which adjusting comprises dropping unmarked data packets under congestion conditions.

30. The method of claim 29 in which adjusting comprises setting a congestion notification bit in unmarked data packets under congestion conditions.

31. The method of claim 26 in which the data packets are Transmission Control Protocol (TCP) packets.

32. The method of claim 26 in which the data packets are User Datagram Protocol (UDP) packets.

33. The method of claim 26 in which the data packets are Transmission Control Protocol (TCP) packets and User Datagram Protocol (UDP).

34. An article comprising:
a storage medium having stored thereon instructions that when executed by a machine results in the following:
monitoring data packets passing through an edge router in a network using token buckets and a Proportional and Integral (P+I) control class of an Active Queue Management (AQM) scheme to determine a send rate;
marking selected data packets falling within a profile associated with a minimum throughput rate, wherein the profile is dynamically adjustable over an unbounded range based on the difference between the minimum throughput rate and the determined send rate; and
giving flow preference to marked data packets under congestion conditions.

35. An article comprising:

a storage medium having stored thereon instructions that when executed by a machine results in the following:

receiving data packets;

monitoring the data packets using token buckets and a Proportional and Integral (P+I) control class of an Active Queue Management (AQM) scheme to determine a send rate;

marking selected data packets falling within a profile associated with a minimum throughput rate, wherein the profile is dynamically adjustable over an unbounded range based on the difference between the minimum throughput rate and the determined send rate; and adjusting flaw preference of the monitored packets.

36. An article comprising:

a storage medium having stored thereon instructions that when executed by a machine results in the following:

receiving data packets in a plurality of routing devices linked in a network;

monitoring the data packets using token buckets and a Proportional and Integral (P+I) control class of an Active Queue Management (AQM) scheme to determine a send rate;

marking selected data packets falling within a profile associated with a minimum throughput rate, wherein the profile is dynamically adjustable over an unbounded range in based on the difference between the minimum throughput rate and the determined send rate; and adjusting flow preference of the monitored packets.

* * * * *